United States Patent
Park

(10) Patent No.: US 10,162,998 B2
(45) Date of Patent: Dec. 25, 2018

(54) WEARABLE GLASSES, CONTROL METHOD THEREOF, AND VEHICLE CONTROL SYSTEM

(71) Applicant: HYUNDAI MOTOR COMPANY, Seoul (KR)

(72) Inventor: Sung Woo Park, Seoul (KR)

(73) Assignee: HYUNDAI MOTOR COMPANY, Seoul (KR)

(\*) Notice: Subject to any disclaimer, the term of this patent is extended or adjusted under 35 U.S.C. 154(b) by 406 days.

(21) Appl. No.: 14/954,482

(22) Filed: Nov. 30, 2015

(65) Prior Publication Data

US 2016/0173865 A1 Jun. 16, 2016

(30) Foreign Application Priority Data

Dec. 11, 2014 (KR) .................... 10-2014-0178327

(51) Int. Cl.
*H04N 5/253* (2006.01)
*H04N 9/47* (2006.01)
(Continued)

(52) U.S. Cl.
CPC ......... *G06K 9/00281* (2013.01); *G01C 21/20* (2013.01); *G06F 3/012* (2013.01);
(Continued)

(58) Field of Classification Search
CPC ............ G06K 9/00281; G06K 9/00597; G06F 3/012; G06F 3/013; G01C 21/20;
(Continued)

(56) References Cited

U.S. PATENT DOCUMENTS

| | | | |
|---|---|---|---|
| 2007/0156540 A1* | 7/2007 | Koren | G06Q 10/087 705/14.51 |
| 2008/0158096 A1* | 7/2008 | Breed | B60N 2/002 345/7 |

(Continued)

FOREIGN PATENT DOCUMENTS

| | | |
|---|---|---|
| JP | 2000-187552 A | 7/2000 |
| JP | 2011-14082 A | 1/2011 |

(Continued)

OTHER PUBLICATIONS

Korean Office Action issued in Korean Application No. 10-2014-0178327 dated Sep. 22, 2015.

(Continued)

*Primary Examiner* — Jared Walker
(74) *Attorney, Agent, or Firm* — McDermott Will & Emery LLP

(57) ABSTRACT

Wearable glasses include a first capturer for photographing a front part, a second capturer for tracking a gaze direction of a user, and a controller for matching a target image captured by the first capturer with a three-dimensional (3D) interior map of a vehicle, corresponding to the target image, and determining a head direction of the user. The controller specifies an object corresponding to user gaze in the target image based on the determined head direction and the tracked gaze direction of the user. Accordingly, user convenience is enhanced.

14 Claims, 7 Drawing Sheets

(51) Int. Cl.
*G06K 9/00* (2006.01)
*G06F 3/01* (2006.01)
*G01C 21/20* (2006.01)

(52) U.S. Cl.
CPC ......... *G06F 3/013* (2013.01); *G06K 9/00597* (2013.01); *H04N 2213/008* (2013.01)

(58) Field of Classification Search
CPC ...... H04N 2213/008; G02B 2027/0178; G02B 2027/0187
USPC ......................................................... 348/112
See application file for complete search history.

(56) References Cited

U.S. PATENT DOCUMENTS

| | | | | |
|---|---|---|---|---|
| 2009/0022368 | A1* | 1/2009 | Matsuoka | B60K 35/00 382/103 |
| 2012/0154441 | A1* | 6/2012 | Kim | G06K 9/00832 345/633 |
| 2012/0249741 | A1* | 10/2012 | MacIocci | G06F 3/011 348/46 |
| 2014/0139655 | A1* | 5/2014 | Mimar | G08B 21/06 348/77 |

FOREIGN PATENT DOCUMENTS

| | | |
|---|---|---|
| KR | 10-2012-0060978 A | 6/2012 |
| KR | 10-2012-0067854 A | 6/2012 |
| KR | 2012-0071220 A | 7/2012 |
| KR | 10-2012-0127790 A | 11/2012 |
| KR | 10-2013-0015488 A | 2/2013 |
| KR | 10-2014-0117469 A | 10/2014 |

OTHER PUBLICATIONS

Korean Office Action issued in Korean Application No. 10-2014-0178327, dated Aug. 23, 2016.

* cited by examiner

WEARABLE GLASSES, CONTROL METHOD THEREOF, AND VEHICLE CONTROL SYSTEM

CROSS-REFERENCE TO RELATED APPLICATION

This application claims the benefit of Korean Patent Application No. 10-2014-0178327, filed on Dec. 11, 2014, which is hereby incorporated by reference as if fully set forth herein.

TECHNICAL FIELD

The present disclosure relates to wearable glasses, a control method thereof, and a vehicle control system, and more particularly, to wearable glasses for efficiently controlling a vehicle, a control method thereof, and a vehicle control system.

BACKGROUND

Along with rapid development of electronic control technologies, various apparatuses, which are conventionally operated in a vehicle using a mechanical method, have been driven using an electrical method for driver convenience and driving safety, and a vehicle system has been gradually enhanced and most advanced. Among these technologies, technologies installed in a vehicle have developed continuously.

A level of a mobile terminal has also been developed and a mobile terminal has been configured in the form of wearable glasses.

Wearable glasses capture an image using a camera mounted thereon, display the captured image, and can communicate with other electronic apparatuses. Accordingly, various technologies using wearable glasses have been introduced, in accordance with current trends.

The conventional art discloses technology for acquiring an eyeball image, tracking a gaze position, and performing a corresponding command. However, there is a need for wearable glasses for efficiently controlling a vehicle and a vehicle control method using the wearable glasses.

CITED REFERENCE

Patent Document

Korean Patent Publication No. 2013-0015488

SUMMARY

Accordingly, the present invention is directed to wearable glasses, a control method thereof, and a vehicle control system that substantially obviates one or more problems due to limitations and disadvantages of the related art.

An object of the present invention is to provide wearable glasses that accurately recognize user's gaze using a plurality of capturers.

Another object of the present invention is to provide wearable glasses and a vehicle control method using the same, for matching a three-dimensional (3D) interior map and a corresponding captured image and controlling the wearable glass to more easily recognize an object on which user's gaze is fixed.

A vehicle control system can include a vehicle communicator terminal for transmitting three-dimensional (3D) interior map information to wearable glasses. Wearable glasses can be engaged with the vehicle communicator, in order for receiving the 3D interior map information, matching a target image captured by a first capturer with a three-dimensional (3D) interior map of a vehicle, corresponding to the target image, determining a head direction of the user, and tracking a gaze direction of the user by a second capturer. The wearable glasses can specify an object corresponding to user gaze in the target image based on the determined head direction and the tracked gaze direction of the user.

The wearable glasses highlight and display the object corresponding to the user gaze in the target image.

The wearable glasses perform a preset operation when the user gaze is not fixed on a driving gaze region for a preset time during vehicle driving.

The wearable glasses perform a warning notice service when the user gaze is not fixed on the driving gaze region for the preset time during vehicle driving.

The vehicle control system further comprises object corresponding to the user gaze, The wearable glasses transmit a message indicating that the object needs to stand by to receive a control command and performs an operation corresponding to the control command when the object receives the control command.

The wearable glasses transmit the message indicating that the object needs to stand by to receive the control command, to the object through the AVN terminal.

A vehicle control system can include a vehicle communicator configured to transmit three-dimensional (3D) interior map information to wearable glasses. The vehicle communicator can also receive information regarding controllable substance from the wearable glasses. When an operation command regarding the controllable substance is inputted, a controller can control the controllable substance according to operating command. The vehicle communicator is included in an audio-video-navigation (AVN) terminal.

The controllable substance includes at least one of a side mirror, a room mirror, a rear mirror and a headlight.

The vehicle control system further comprises a sound command receiver configured to receive the operation command related to the controllable substance.

The controller is configured to provide an alert message, when receiving a signal of informing deviation out of a driving gaze region.

The three-dimensional (3D) interior map information includes a 3D image or video signal.

A vehicle control system can include a vehicle communicator for receiving a view data related to user head and eye moving. The vehicle control system can include a controller for, based on the view data and pre-stored three-dimensional (3D) interior map information, specifying a controllable substance and for controlling the controllable substance according to an operation command when the operating command regarding the controllable substance is inputted.

The vehicle communicator is included in an audio-video-navigation (AVN) terminal.

The controllable substance includes at least one of a side mirror, a room mirror, a rear mirror and a headlight.

The vehicle control system further includes a sound command receiver is configured to receive a operational command related to substance.

The controller is configured to provide an alert message, when receiving a signal of informing deviation out of a driving gaze region.

Three-dimensional (3D) interior map information includes 3D image.

The controller is configured to specifying the controllable substance information when user sight is focused on the controllable substance for a predetermined time.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling wearable glasses worn by a user includes matching a target image captured by a first capturer with a three-dimensional (3D) interior map of a vehicle, corresponding to the target image, and determining a head direction of the user, tracking a gaze direction of the user by a second capturer, and specifying an object corresponding to user gaze in the target image based on the determined head direction and the tracked gaze direction of the user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
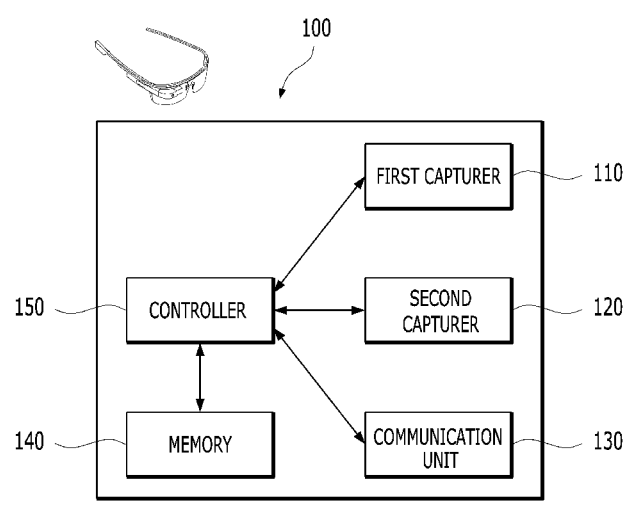
FIG. 1 is a block diagram of wearable glasses according to an embodiment of the present invention.

Hereinafter, the present invention will be described in detail by explaining exemplary embodiments of the invention with reference to the attached drawings. The same reference numerals in the drawings denote like elements, and a repeated explanation thereof will not be given. In addition, the suffixes "module" and "unit" of elements herein are used for convenience of description and thus can be used interchangeably and do not have any distinguishable meanings or functions. Further, in the following description of the at least one embodiment, a detailed description of known functions and configurations incorporated herein will be omitted for the purpose of clarity and for brevity. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in addition to the accompanying drawings in the present invention.

It will be understood that, although the terms first, second, third, etc. may be used herein to describe various elements, these elements should not be limited by these terms. These terms are only used to distinguish one element from another element.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements present.

The singular expressions in the present specification include the plural expressions unless clearly specified otherwise in context.

It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

FIG. 1 is a block diagram of wearable glasses 100 according to an embodiment of the present invention.

Referring to FIG. 1, the wearable glasses 100 include a first capturer 110, a second capturer 120, a communication unit 130, a memory 140, and a controller 150. However, components illustrated in FIG. 1 are not necessary to embody the wearable glasses 100, and thus wearable glasses described throughout this specification may include more or fewer components than the above listed components.

The first capturer 110 photographs a part (a front part) in a direction in which a user who wears the wearable glasses 100 views. The first capturer 110 may process a still image or an image frame of a video, which is obtained by an image sensor of the first capturer 110 in a photography mode or a videotelephony mode, according to control of the controller 150. The processed image frame may be displayed by a display (not shown) of the wearable glasses 100 or stored in the memory 140.

The second capturer 120 may photograph the user who wears the wearable glasses 100. In particular, the second capturer 120 may track and photograph ocular movement (e.g., pupil) of the user. In addition, the first capturer 110 and the second capturer 120 may be disposed adjacent to at least one of right and left eyes of the user.

Here, the ocular movement of the user may be measured through the second capturer 120 so as to recognize a gaze direction of the user.

In addition, a front part is photographed through the first capturer 110 so as to recognize head movement of the user and to accurately determine user gaze.

The communication unit 130 communicates with an external device. The communication unit 130 may communicate with an external device by wire or wirelessly. The communication unit 130 may communicate with a vehicle audio, video, navigation (AVN) terminal and an electronic control unit (ECU) in a vehicle via wireless communication such as Bluetooth, WiFi, and so on.

In addition, the communication unit 130 may communicate with an external mobile terminal using a mobile communication module included in the communication unit 130.

The memory 140 stores data that supports various functions of the wearable glasses 100. The memory 140 may store a plurality of application programs or applications driven by the wearable glasses 100, and data and command for an operation of the wearable glasses 100. At least some of the application programs may be downloaded from an external center via wireless communication. In addition, at least some of the application programs may be pre-installed on the wearable glasses 100 from the release of the wearable glasses 100 for a basic function of the wearable glasses 100. An application program may be stored in the memory 140, installed on the wearable glasses 100, and driven to perform an operation (or a function) of the wearable glasses 100 via the controller 150.

The memory 140 may include at least one of a flash memory type storage unit, a solid state disk (SSD) type storage unit, a silicon disk drive (SDD) type storage unit, a multimedia card micro type storage unit, and a card type storage unit (e.g., an SD or XD storage unit). In addition, the memory 140 may be configured in the form of web storage.

The controller 150 may control an overall operation of the wearable glasses 100. A detailed control method will be described below with reference to FIG. 3.

Figure 2:
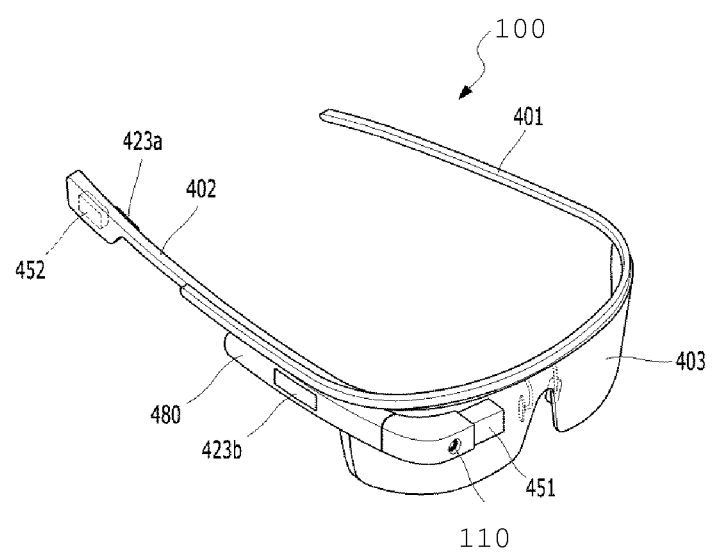
FIG. 2 is a perspective view illustrating an outer appearance of wearable glasses according to an embodiment of the present invention.

FIG. 2 is a perspective view illustrating an outer appearance of wearable glasses 100 according to an embodiment of the present invention.

Referring to FIG. 2, the wearable glasses 100 may be configured to be wearable on a head of the human body and, as such, may include a frame unit (a case, a housing, etc.). The frame unit may be formed of a flexible material such that the user can easily wear the wearable glasses 100. This drawing exemplifies the case in which the frame unit includes a first frame 401 and a second frame 402 that are formed of different materials. Here, the wearable glasses 100 are assumed to perform functions of a mobile terminal.

The frame unit is supported by a head portion and provides a space for mounting various components. As illustrated in the drawing, an electronic component such as a control module 480, an audio output module 452, and so on may be mounted on the frame unit. In addition, a lens 403 for covering at least one of right and left eyes may be detachably mounted on the frame unit.

The control module 480 is configured to control various electronic components included in the wearable glasses 100. The control module 480 is understood as a component corresponding to the aforementioned controller 150. This drawing exemplifies the case in which the control module 480 is mounted on the frame unit at one side of the head. However, a position of the control module 480 is not limited thereto.

A display unit 451 may be embodied in the form of a head mounted display (HMD). The HMD form refers to a display that is mounted on the head to show an image directly to eyes of a user. When the user wears the wearable glasses 100, the display unit 451 may be disposed to correspond to at least one of right and left eyes in order to provide an image directly to the eyes of the user. This drawing exemplifies the case in which the display unit 451 is positioned to correspond to a right eye of a user in order to output an image toward the right eye.

The display unit 451 may project an image toward user eyes using a prism. In addition, the prism may be translucent such that the user can see the projected image and a general visual field (a range viewed through the user eyes) in a front direction.

The image output through the display unit 451 may be overlapped and displayed with a general visual field. The wearable glasses 100 may provide augmented reality (AR) that overlaps a visual image with an actual image or a background to show one image using the displaying characteristic.

A first capturer 110 is disposed adjacent to at least one of right and left eyes and formed to capture a front image. Since the first capturer 110 is positioned adjacent to an eye, the first capturer 110 may acquire a scene viewed by the user as an image.

This drawing exemplifies the case in which the first capturer 110 is included in the control module 480, but the present invention is not limited thereto. The first capturer 110 may be installed in the frame unit and a plurality of capturers may be configured to acquire a stereoscopic image.

The wearable glasses 100 may include user input units 423a and 423b that are manipulated to receive a control command. The user input units 423a and 423b may employ any method as long as the method is a tactile manner of manipulating an input unit while a user experiences tactile sensation such as touch, push, etc. This drawing exemplifies the case in which the frame unit and the control module 480 include the user input units 423a and 423b using push and touch input methods, respectively.

In addition, the wearable glasses 100 may include a microphone (not shown) for receiving sound and processing the sound into electrical voice data and the audio output module 452 for outputting audio. The audio output module 452 may be configured to transmit sound using a general audio output method or a bone conduction method. When the audio output module 452 employs a bone conduction method, if the user wears a mobile terminal, i.e., the wearable glasses 100, the audio output module 452 is pressed against a head and vibrates the cranium to transmit sound.

Although not shown in FIG. 2, the wearable glasses 100 may include the second capturer 120. The second capturer 120 may track an eyeball and photograph the eyeball in a direction of a pupil. Accordingly, the second capturer 120 may track a gaze direction of the user. However, although a gaze direction of the user is tracked by only the second capturer 120, it is difficult to recognize a user gaze direction. This is because user gaze is changed according to head movement even if the user gaze direction is fixed.

Figure 3:
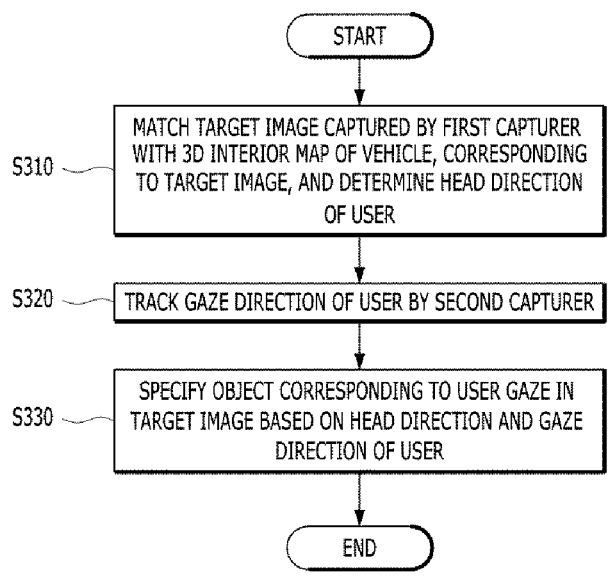
FIG. 3 is a flowchart illustrating a method of controlling wearable glasses according to an embodiment of the present invention.

FIG. 3 is a flowchart illustrating a method of controlling wearable glasses according to an embodiment of the present invention.

First, the controller 150 matches a target image captured through a first capturer 110 with a three-dimensional (3D) interior map corresponding to the target image to determine a head direction of the user (S310), which will be described in detail with reference to FIGS. 4A and 4B.

Figure 4A:
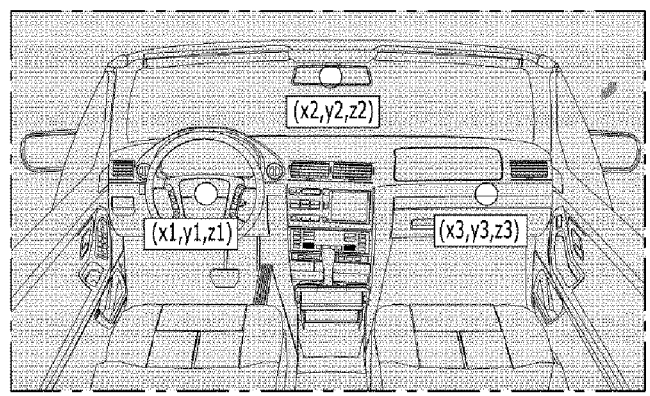
FIG. 4A illustrates a 3D interior map and FIG. 4B is a diagram illustrating an image captured by photographing a view corresponding to the 3D interior map through a first capturer.

FIG. 4A illustrates a 3D interior map. FIG. 4B is a diagram illustrating an image captured by photographing a view corresponding to the 3D interior map through the first capturer 110.

The 3D interior map includes data for displaying an inner part of a vehicle based on view information of the inner part of the vehicle. The data information of the 3D interior map may be based on 3D so as to provide reality and a three-dimensional effect.

The controller 150 may receive a 3D interior map (for example, which is stored in an AVN terminal) stored in the vehicle through the communication unit 130. The 3D interior map may be displayed through a display unit (not shown) mounted on the wearable glasses 100.

The controller 150 may set a plurality of first standard points (X1, Y1, Z1), (X2, Y2, Z2), and (X3, Y3, Z3) on an image illustrated in FIG. 4A corresponding to a specific view of the inner part of the vehicle. The controller 150 may capture the target image through the first capturer 110 so as to correspond to a specific map of a 3D interior view, as illustrated in FIG. 4B. In addition, the controller 150 may set a plurality of second standard points (X4, Y4, Z4), (X5, Y5, Z5), and (X6, Y6, Z6) so as to correspond to the plurality of first standard points. The controller 150 matches the target image (FIG. 4B) captured by the first capturer 110 with the 3D interior map (FIG. 4B) corresponding to the target image.

Figure 4B:
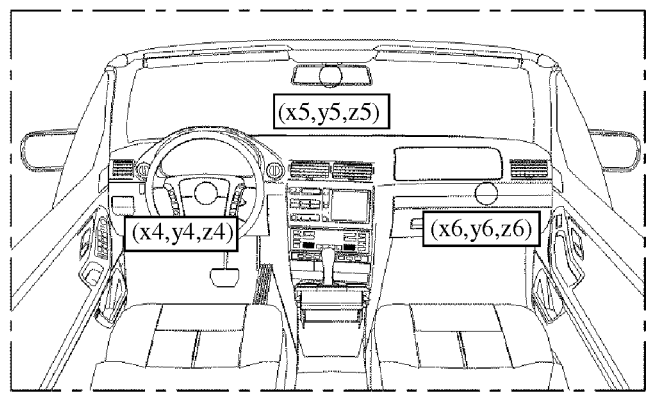

Here, the image of FIG. 4B is configured as a 2D image. However, according to future technological development, the controller 150 may configure an image as a 3D image.

As such, when the controller 150 matches the 3D interior map with the target image corresponding thereto, since 3D data is better than 2D data in terms of spatial expression, object recognition of wearable glasses may be enhanced.

Figure 5:
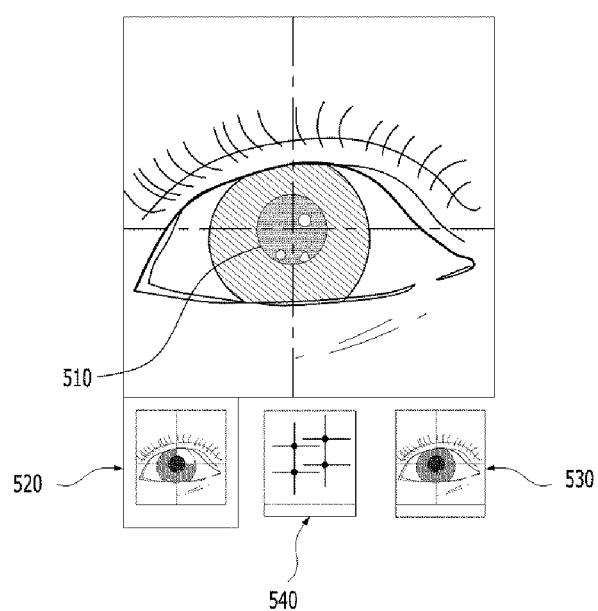
FIG. 5 is a diagram illustrating the case in which ocular movement of a user is tacked, using wearable glasses according to an embodiment of the present invention.

Referring back to FIG. 3, after operation S310, a second capturer tracks a gaze direction of the user (S320). This operation will be described with reference to FIG. 5. Operation S320 is described as a subsequent operation to operation S310, but operation S320 may be performed prior to operation S310.

The controller 150 may control the second capturer 120 to track and photograph ocular movement of the user.

The controller 150 may track movement of a user's pupil 510. For example, when a user's pupil moves downward (520) or upward (S530), the controller 150 may track and photograph the user's pupil. In addition, the controller 150 may track a line of movement of the user's pupil (540).

Here, the controller 150 may track a gaze direction of the user through the second capturer 120 but cannot accurately recognize user gaze direction. For example, even if the user's pupil is directed to the same point, when a user's head moves, the controller 150 cannot recognize accurate user gaze direction. In this case, the controller 150 may accurately determine the user gaze direction through the first capturer 110.

Referring back to FIG. 3, after operation S320, the controller 150 specifies an object corresponding to the user gaze on the target image based on the tracked gaze direction (S330), which will be described with reference to FIG. 6.

Figure 6:
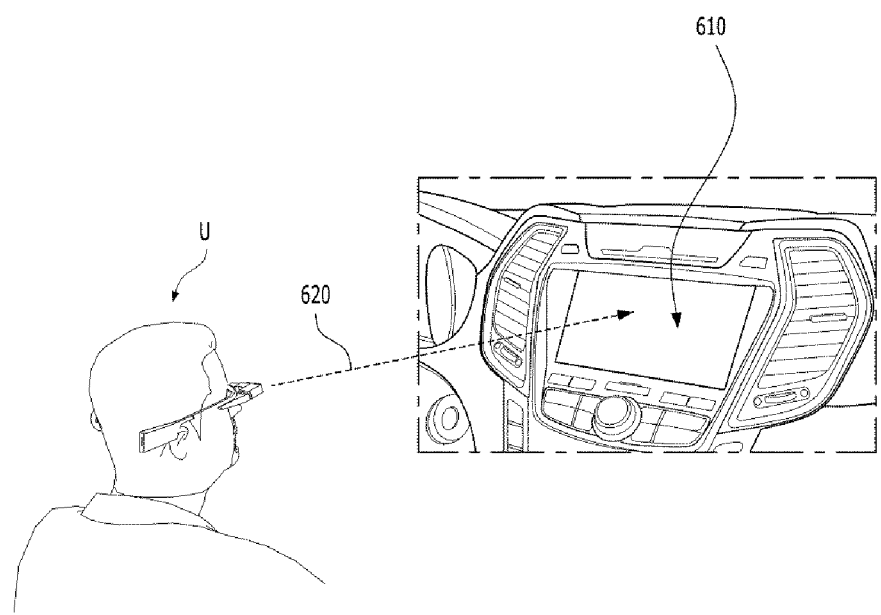
FIG. 6 is a diagram illustrating the case in which user gaze is fixed on a specific object.

FIG. 6 is a diagram illustrating the case in which user gaze is fixed on a specific object.

Referring to FIG. 6, the controller 150 may track ocular movement of the user through the second capturer 120 while capturing the image through the first capturer 110. The controller 150 may recognize gaze of a user U and specify an object viewed by the user U. When the user sees an AVN terminal 610, the controller 150 may specify an AVN terminal.

Here, the controller 150 may specify an AVN terminal, a side mirror, a cluster, a HUD, a handle, etc. to which user gaze is fixed. The specified object may be verified in addition to the aforementioned objects.

In this case, the controller 150 may display an image captured by the first capturer 110 on a display (not shown) of the wearable glasses 100 and may additionally highlight and display an object specified by gaze of the user U.

The controller 150 may perform various operations based on gaze of the user U. When gaze of the user U is fixed on an object for a preset period of time, the controller 150 may determine that a preset control command is input.

Hereinafter, various embodiments will be described.

When driver gaze deviates from a windshield of a vehicle for a preset time point or more during vehicle driving, the controller 150 may perform a preset operation. In this case, the controller 150 may determine that the driver drives while drowsy. In this case, the controller 150 may generate a warning notice and indicate the warning notice to the user.

When the user gaze is fixed on a controllable unit (e.g., a side mirror, a rear mirror, right and left blinkers, etc.), the controllable unit may be determined as a control target. In this case, when manipulation is input to the corresponding controllable unit, the corresponding controllable unit may perform an operation corresponding to the input manipulation.

In addition, wearable glasses may be used as an auxiliary recognition device of a voice command. For example, when gaze is fixed on a right blinker for 2 seconds and a voice command "on" is input, the corresponding right blinker may be turned on.

In addition, when driver gaze deviates from a driving gaze region for a predetermined time, a sound system in the vehicle may generate a warning sound or adjust vehicle speed. Here, the driving gaze region refers to a predetermined region to which gaze needs to be fixed while the driver drives.

In addition, after gaze is fixed on a right side mirror, a position of the mirror may be adjusted through an up, down, right, and left manipulation system of a steering wheel.

In addition the aforementioned embodiments, various functions may be performed using wearable glasses.

A vehicle control system according to another embodiment of the present invention may include an AVN terminal for transmitting 3D interior map information to the wearable glasses 100, and the wearable glasses 100 that receive the 3D interior map information, match a target image captured by the first capturer 110 with a 3D interior map corresponding to the target image, determine a head direction of the user, and track a gaze direction of the user through the second capturer 120. Here, the wearable glasses 100 may specify an object corresponding to user gaze in the second image that is being captured, based on the determined head direction and the tracked gaze direction.

Here, the wearable glasses 100 may transmit a message indicating that a specific object needs to stand by to receive a control command, to the object. When the specific object cannot immediately communicate with the wearable glasses 100, the AVN terminal may receive corresponding information from the wearable glasses 100 and transmit the corresponding information to the specified object through vehicle internal communication (e.g., CAN). When the specific object receives a control command, an operation corresponding to the control command may be performed.

In a computer readable recording medium for execution of a method of controlling an AVN terminal according to an embodiment of the present invention, the control method may include determining a position of a wearable device and providing a service based on the position. The computer readable medium may include any type of recording devices in which data readable by a computer system can be stored. Examples of the computer readable medium may include a hard disk drive (HDD), a solid state disk (SSD), a silicon disk drive (SDD), ROM, RAM, a CD-ROM, magnetic tape, a floppy disk, an optical data storage device, etc. and also be embodied in the form of a carrier wave (e.g., transmission over the Internet). In addition, the computer readable medium may include the controller 150 of the terminal. Thus, the above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

According to the aforementioned various embodiments of the present invention, user gaze may be accurately recognized using a plurality of capturers, thereby enhancing user convenience and device efficiency.

In addition, a 3D interior map and a captured image corresponding thereto are matched with each other so as to more easily recognize an object on which user gaze is fixed, thereby enhancing user convenience and device efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A vehicle control system comprising:
   a vehicle communicator configured to transmit three-dimensional (3D) interior map information to wearable glasses, and for receiving information regarding controllable substance from the wearable glasses; and
   a controller configured, when an operation command regarding the controllable substance is inputted, to control the controllable substance according to the operation command,
   wherein when user's sight is fixed on the controllable substance for a predetermined time and the controllable substance is specified through the wearable glasses, the controller receives the operation command regarding the specified controllable substance from the wearable glasses.

2. The vehicle control system according to claim 1, wherein the vehicle communicator is included in an audio-video-navigation (AVN) terminal.

3. The vehicle control system according to claim 1, wherein the controllable substance includes at least one of a side mirror, a room mirror, a rear mirror and a headlight.

4. The vehicle control system according to claim 1, further comprising:
   a sound command receiver configured to receive the operation command related to the controllable substance.

5. The vehicle control system according to claim 1, wherein the controller is configured to provide an alert message, when receiving a signal of informing deviation out of a driving gaze region.

6. The vehicle control system according to claim 1, wherein the three-dimensional (3D) interior map information includes a 3D image or video signal.

7. The vehicle control system according to claim 1, wherein the controller is configured to receive the information about the controllable substance from the wearable glasses through the vehicle communicator, when the user's sight is focused on the controllable substance for the predetermined time.

8. A vehicle control system comprising:
   a vehicle communicator for receiving a view data related to user head and eye moving; and
   a controller for, based on the view data and pre-stored three-dimensional (3D) interior map information, specifying a controllable substance and for controlling the controllable substance according to an operation command when the operation command regarding the controllable substance is inputted,
   wherein when user's sight is fixed on the controllable substance for a predetermined time and the controllable substance is specified through the wearable glasses, the controller receives the operation command regarding the specified controllable substance from the wearable glasses.

9. The vehicle control system according to claim 8, wherein the vehicle communicator is included in an audio-video-navigation (AVN) terminal.

10. The vehicle control system according to claim 8, wherein the controllable substance includes at least one of a side mirror, a room mirror, a rear mirror and a headlight.

11. The vehicle control system according to claim 8, the vehicle control system further comprising:
    a sound command receiver is configured to receive an operational command related to substance.

12. The vehicle control system according to claim 8, wherein the controller is configured to provide an alert message, when receiving a signal of informing deviation out of a driving gaze region.

13. The vehicle control system according to claim 8, wherein three-dimensional (3D) interior map information includes 3D image.

14. The vehicle control system according to claim 1, wherein the controller is configured to specify the controllable substance information when the user's sight is focused on the controllable substance for the predetermined time.

* * * * *